(12) United States Patent
Kucharski et al.

(10) Patent No.: US 11,456,881 B2
(45) Date of Patent: Sep. 27, 2022

(54) LIFECYCLE MANAGEMENT METHOD AND APPARATUS FOR TRUSTED CERTIFICATES AND TRUST CHAINS

(71) Applicant: MOTOROLA SOLUTIONS, INC., Chicago, IL (US)

(72) Inventors: Wojciech Kucharski, Rzeszow (PL); Elizeusz Musial, Cracow (PL); Andrzej Grzesik, Jaworzno (PL); Marcin Tomasik, Wieliczka (PL); Chris A. Kruegel, Plainfield, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 249 days.

(21) Appl. No.: 16/624,431

(22) PCT Filed: Jun. 30, 2017

(86) PCT No.: PCT/PL2017/050036
§ 371 (c)(1),
(2) Date: Dec. 19, 2019

(87) PCT Pub. No.: WO2019/004849
PCT Pub. Date: Jan. 3, 2019

(65) Prior Publication Data
US 2020/0136838 A1    Apr. 30, 2020

(51) Int. Cl.
*H04L 9/32* (2006.01)
(52) U.S. Cl.
CPC ........... *H04L 9/3268* (2013.01); *H04L 9/321* (2013.01); *H04L 9/3265* (2013.01)

(58) Field of Classification Search
CPC ..... H04L 9/3268; H04L 9/321; H04L 9/3265; H04L 63/0823
See application file for complete search history.

(56) References Cited

U.S. PATENT DOCUMENTS 6,134,550 A * 10/2000 Van Oorschot ......... G06F 21/33
6,397,329 B1    5/2002 Aiello et al.
(Continued)

FOREIGN PATENT DOCUMENTS

CA          2502480 A1 *  5/2004  ........... H04L 9/0891
WO  WO-2016026536 A1 *  2/2016  ........... H04L 9/0891

OTHER PUBLICATIONS

Wolters, Robert, Examiner, International Search Report, dated Feb. 21, 2018, "Lifecycle Management Method and Apparatus for Trusted Certificates and Trust Chains", PCT Application No. PCT/PL2017/050036, filed Jun. 30, 2017.
(Continued)

*Primary Examiner* — Carl G Colin
*Assistant Examiner* — Hany S. Gadalla
(74) *Attorney, Agent, or Firm* — Perry + Currier, Inc.

(57) ABSTRACT

A method and apparatus is provided for updating certificates in a trust chain and managing versions of the trust chain. A first electronic processor determines that a first certificate in a first level of the trust chain is to be updated, updating the first certificate and each certificate in a lower level in the trust chain that is lower than the first level, creates a second version of the trust chain including an updated first certificate and an updated certificate at each lower level in the trust chain, and transmits the second version of the trust chain to one or more entities.

19 Claims, 7 Drawing Sheets

(56) References Cited

U.S. PATENT DOCUMENTS

| | | | |
|---|---|---|---|
| 7,877,600 B2 | 1/2011 | Qiu et al. | |
| 8,392,702 B2 | 3/2013 | Qiu et al. | |
| 9,397,835 B1* | 7/2016 | Campagna | H04L 9/0891 |
| 2005/0177715 A1 | 8/2005 | Somin et al. | |
| 2014/0215206 A1* | 7/2014 | Courtney | H04W 12/043 |
| | | | 713/156 |
| 2014/0244998 A1 | 8/2014 | Amenedo et al. | |
| 2016/0315777 A1 | 10/2016 | Lloyd et al. | |
| 2016/0323110 A1* | 11/2016 | Campagna | H04L 9/0891 |
| 2018/0234256 A1* | 8/2018 | Bowen | H04L 63/0245 |

OTHER PUBLICATIONS

Internet X.509 Public Key Infrastructure Certificate and Certificate Revocation List (CRL) Profile—http://web.archive.org/web/20170627182644/https://tools.ietf.org/html/rfc5280 Jun. 27, 2017.

\* cited by examiner

LIFECYCLE MANAGEMENT METHOD AND APPARATUS FOR TRUSTED CERTIFICATES AND TRUST CHAINS

BACKGROUND OF THE INVENTION

A digital certificate may be created in a public key infrastructure (PKI) and may be used to identify ownership of a public key as a part of a cryptographic protocol executed to authenticate an end entity and subsequently grant access to a service. The end entity may be a user, a device or an application. The public key in a digital certificate and an associated private key allow for encryption and authentication and are used to establish trusts between two entities. In order to obtain a digital certificate from a PKI, the end entity typically sends a certificate signing request (CSR) to a component (for example, a registration authority (RA) or a certification authority (CA)) in the PKI. The certificate generated by the PKI has a chain of trust, i.e., a hierarchical list of certificates that terminates with a trust anchor certificate, representing a root CA, and that may include one or more intermediate certificates that represent intermediate CAs. Each certificate in the trust chain is signed with a private key associated with the next certificate in the chain. As such, in a trust chain used to issue an end entity certificate and including an intermediate CA certificate and a trust anchor certificate, the end entity certificate (i.e., the certificate at the lowest level) is signed with the private key associated with the intermediate CA certificate and the intermediate CA certificate is signed with the private key associated with the trust anchor certificate (i.e., the certificate at the highest level of the trust chain). A trust chain may have from 1-$n$ certificates, depending on the security policies of an organization.

Each certificate in a trust chain has a lifespan, i.e., a time period during which the certificate is valid. The end entity certificate has the shortest lifespan, with the lifespan of each certificate in the trust chain increasing based on its level in the hierarchy of the trust chain, ending with the trust anchor certificate having the longest lifespan. The lifespans given to each certificate is determined by the issuer. In some industries, for example, in consumer industries such as the telecommunications industry, the root CA and intermediate CA certificates may have long lifespans of, for example, multiple decades. These long lifespans reduce the need to rotate or update these certificates.

High security industries, on the other hand, typically require that the certificates have shorter lifespans. In these high security industries, certificates with short lifespans in a trust chain need to be rotated or updated without service interruptions. Manual root certificate rotations might be suitable for small commercial systems but are unsuitable for large public safety systems.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
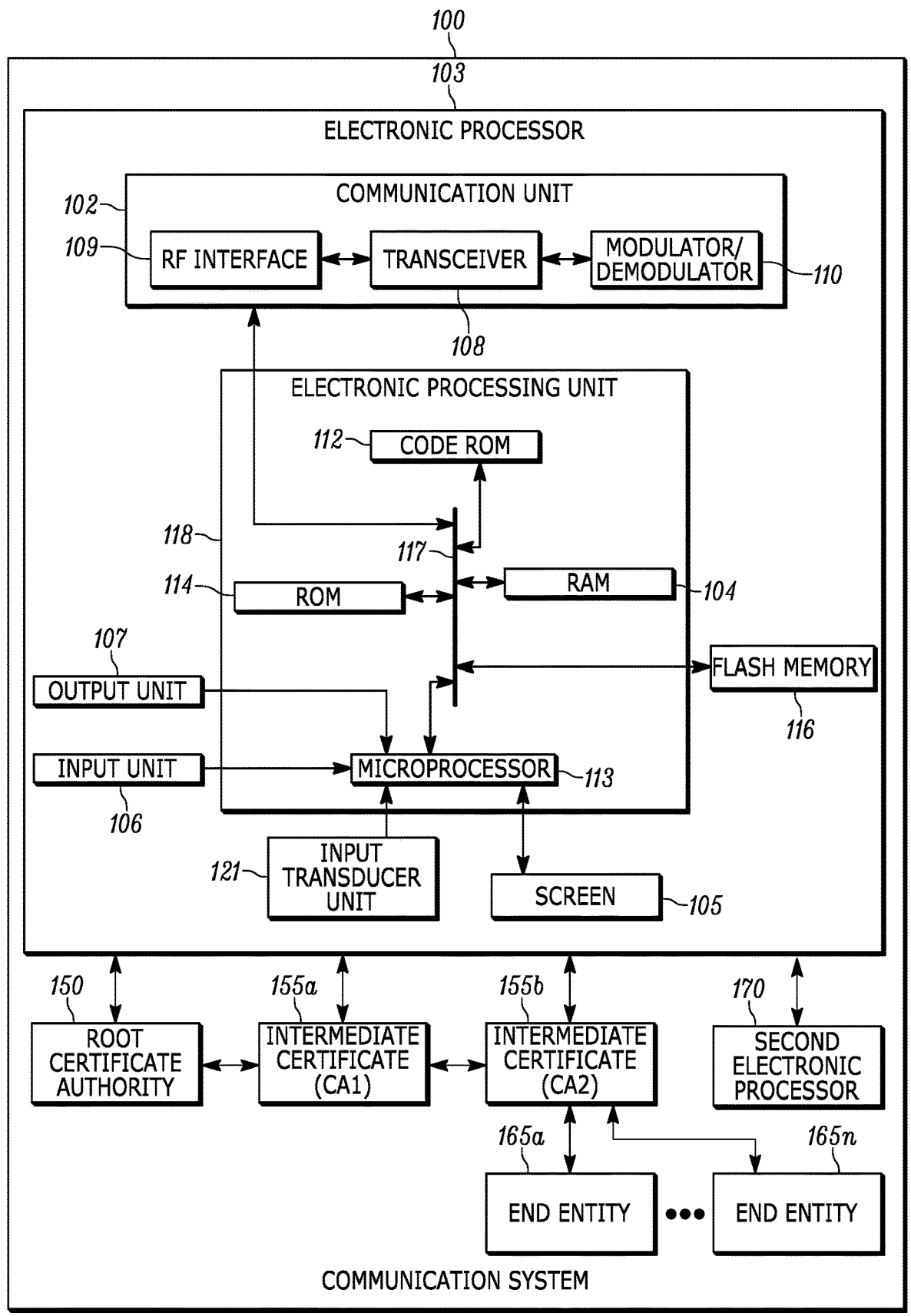
FIG. 1 is a block diagram of a communications system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to apparatuses and methods of updating certificates in a trust chain including certificates in a hierarchical order and managing versions of the trust chain. A first electronic processor determines that a first certificate in a first level in a hierarchy of the trust chain is to be updated, updates the first certificate and each certificate in a lower level in the hierarchy of the trust chain that is lower than the first level, creates a second version of the trust chain including an updated first certificate and an updated certificate at each lower level in the hierarchy of the trust chain, and transmits the second version of the trust chain to one or more entities.

FIG. 1 is a block diagram of a communication system 100 used in accordance with some embodiments. Communication system 100 includes an electronic processor 103 (also referred to herein as the first electronic processor 103) configured to automate rotation of certificates in trust chains and to manage trust chain versioning. Each trust chain includes a hierarchical list of certificates, each of which is associated with a node or device. At the highest level, the trust chain terminates with a trust anchor (TA) certificate, representing a root certification authority (CA) device or node 150, and may include one or more intermediate certificates that represent intermediate CA devices or nodes 155 (i.e., CA1 155a and CA2 155b). When any certificate in a trust chain is updated, electronic processor 103 is configured to create a new trust chain version, to ensure that the appropriate entities (for example, end entities 165 (i.e., end entities 165a-165n) using the trust chain and/or devices or nodes having certificates in the trust chain (for example, devices 150 and 155)) have the new trust chain version, to enable/activate use of the new trust chain version, and to disable/deactivate (i.e., discontinue use of) a current version of the trust chain. End entities 165 may be users, devices and/or applications requiring authentication in order to gain access to a service.

As certificates in a trust chain are updated, electronic processor 103 centrally manages the versioning of the trust chain by centrally managing the overall version of the trust chain. Certificates lifespans (i.e., the time period during which the certificate is valid) decrease from the top (i.e., the trust anchor certificate) to the bottom of a trust chain. In addition to a validity period, each certificate in the trust chain includes a key including a public key that is associated with a private key.

Consider an example where a trust chain includes a trust anchor certificate associated with trust anchor 150 and two intermediate certification authority certificates associated with CA1 155*a* and CA2 155*b* and described herein as CA1 certificate and CA2 certificate. In a first version of the trust chain, the lifespan of the TA certificate may be 10 years, the lifespan of the CA1 certificate may be 6 years and the lifespan of the CA2 certificate may be 3 years. This trust chain may be used by one or more end entities, for example, one or more of end entities 165*a*-165*n*, wherein the lifespan of an end entity (EE) certificate using this trust chain may be 1 year. In the first version of the trust chain, each of the TA, CA1 and CA2 certificates may include a first key and a field in the certificate that specifies the validity period of the certificate. Therefore, when the EE certificate uses the first version of the trust chain, the EE certificate is signed with the private key associated with the first key in the CA2 certificate, the CA 2 certificate is signed with the private key associated with the first key in the CA1 certificate, and the CA1 certificate is signed with the private key associated with the first key in the TA certificate.

Before the EE certificate expires in each of the first and second years, each end entity 165 may directly request that electronic processor 103 updates (i.e., rekeys and/or renews) the EE certificate and thereby extend the lifespan of the EE certificate. In response to each end entity 165 request, electronic processor 103 may update the EE certificate with the first version of the trust chain. Before the CA2 certificate expires, in an embodiment, without input from the associated intermediate certification authority, i.e., CA2 155*b*, electronic processor 103 is configured to determine that the CA2 certificate is about to expire. Electronic processor 103 may determine that the CA2 certificate needs to be updated by, for example, monitoring the trust chain and determining that the certificate is set to expire at an upcoming date within a predefined time period or by receiving an update request to update the CA2 certificate from a second electronic processor 170 monitoring the trust chain. The second electronic processor 170 may be part of communication system 100 or may be separate from communication system 100. In another embodiment, before the CA2 certificate expires, electronic processor 103 may receive user input, for example, based on a calendar reminder.

Based on the determination that the CA2 certificate needs to be updated, electronic processor 103 is configured to cause entities 150 and 155 (or users associated with entities 150 and 155) in the trust chain to update (i.e., renew and/or rekey) the CA2 certificate. In an embodiment, based on notification from electronic processor 103 the CA1 155*a* (i.e., the entity in the next higher level in the trust chain) or a user of the CA1 155*a* is configured to issue/sign a new CA2 certificate with a new lifespan and a new key (for example, a second key). In another embodiment, rather than issuing a new key, the CA1 155*a* issues/signs a new CA2 certificate with a new lifespan (referred to herein as the second version of the CA2 certificate, wherein the second version of the CA2 certificate is a new certificate configured to use the old (first) key pair). Electronic processor 103 may also create a new (second) version of the trust chain, including the TA certificate with its first key, the CA1 certificate with its first key and the CA2 certificate with the second key or the second version of the CA2 certificate. The updated trust chain is activated prior to being sent to end entities 165 and before it can be used to issue new certificates for end entities 165.

In some cases, electronic processor 103 is configured to identify all of the EE certificates associated with the first version of the trust chain. Considering that each EE certificate associated with the first version of the trust chain is signed with the private key associated with the CA2 certificate, electronic processor 103 may request that each end entity 165 send an update request for those EE certificates using the first version of the trust chain. Subsequent to receiving the update request from an end entity 165, electronic processor 103 is configured to update (i.e., cause an entity in the trust chain to renew and/or rekey) the EE certificate using the second version of the trust chain. In other cases, electronic processor 103 is configured to determine which trust chain each end entity 165 is using and when the end entity 165 sends an update request for an EE certificate using the first version of the trust chain, electronic processor 103 may update the EE certificate with the second version of the trust chain. In updating the EE certificate, the electronic processor 103 may request that the CA2 155*b* update the EE certificate with the CA2 certificate including the second key or with the second version of the CA2 certificate including the first key. The CA2 155*b* signs the updated EE certificate with a private key that is associated with its public key included in the second version of the CA2 certificate. In some embodiments, subsequent to updating the EE certificate, electronic processor 103 may provide the second version of the entire trust chain to the end entity 165. In other embodiments, subsequent to updating the EE certificate, electronic processor 103 may only send the updated portions of the trust chain to the end entity 165 (i.e., electronic processor 103 may only send the updated CA2 certificate to the end entity 165).

Electronic processor 103 transmits a message signed with a private key associated with an electronic processor 103 certificate (referred to herein as EP certificate) to each end entity 165 receiving the second version of the trust chain. The EP certificate trust chain, which may be the same or different from the EE certificate trust chain, may either be put in its entirety on each end entity 165 in a trusted manner, at a time prior to when the message is transmitted, or minimally the trust anchor for the EP certificate may be stored on each end entity 165 in a trusted manner at a time prior to when the message is transmitted. In the signed message, electronic processor 103 may include the EP certificate trust chain to allow the end entity 165 to resolve the trust of the EP certificate. In cases where the end entity 165 can store multiple versions of the EE certificate trust chain, the signed message may include the second version of the EE certificate trust chain or the updated portions of the EE certificate trust chain and the message may instruct the end entity 165 to replace the old trust authority represented in the first version of the EE certificate trust chain with the new authority represented in the second version of the EE certificate trust chain. In cases where the end entity 165 cannot store multiple versions of the EE certificate trust chain, the signed message may include the second version of the EE certificate trust chain or the updated portions of the EE certificate trust chain and the message may instruct the end entity 165 on when and how to replace the old trust authority represented in the first version of the EE certificate trust chain with the new authority represented in the second version of the EE certificate trust chain. Based on the message from electronic processor 103, the end entity 165 may begin to use the second version of the EE certificate trust chain.

At a subsequent time, electronic processor 103 may deactivate (i.e., discontinue use of) the first version of the trust chain such that the second version of the trust chain becomes the current version of the trust chain and the second version of the trust chain is thereafter used to issue new end entity certificates. Prior to deactivating the first version of the trust chain, electronic processor 103 may monitor overall usage of the first version of the trust chain and may deactivate the first version of the trust chain subsequent to determining that end entities 165 using the first version of the trust chain have successfully migrated to the second version of the trust chain or after a predefined time period after creating the second version of the trust chain.

As electronic processor 103 updates (i.e., causes entities in the trust chain or users associated with entities in the trust chain to renew and/or rekey) the certificate for an entity (for example, an intermediate CA 155 or the root CA 150) higher up in the hierarchy of the trust chain, electronic processor 103 also updates (i.e., causes entities in the trust chain or users associated with entities in the trust chain to renew and/or rekey) the certificates of each entity at a lower level in the hierarchy of the trust chain. Consider for example that electronic processor 103 notifies entity/root certification authority 150 or users associated with entity 150 in the trust chain to update the CA1 certificate; electronic processor 103 is also configured to notify entities 150 and 155a in the trust chain or users associated with entities 150 and 155a in the trust chain to update the CA2 certificate that is signed with the private key associated with the CA1 certificate. Continuing with our example, if the CA1 certificate (at, for example, a first level in the trust chain) is rekeyed to include a second key or renewed to include a second version including a new CA1 certificate, the CA2 certificate (at a level in the hierarchy of the trust chain that is lower than the first level) may also be rekeyed to include a third key or renewed to include the third version including a new CA2 certificate and the trust chain is updated to a third version. As such, in the third version of the trust chain, the CA2 certificate (including the third key or the third version) is signed with the private key associated with the CA1 certificate including the second key or with the second version of the CA1 certificate and the CA1 certificate is signed with the private key associated with the TA certificate including the first key. In an embodiment, rather than the third version of the trust chain having a renewed or rekeyed CA2 certificate (i.e., the third version of the CA2 certificate), the current CA2 certificate (i.e., the CA2 certificate including the second key or the second version of the CA2 certificate) may be updated by being signed with the private key associated with the second version of the CA1 certificate. The updated trust chain is activated prior to being sent to end entities 165 and before it can be used to issue new certificates for end entities 165.

Subsequent to updating the CA1 certificate and each certificate in a lower level than the CA1 certificate, electronic processor 103 transmits a message signed with the private key associated with the EP certificate to end entities 165 using the trust chain. At a subsequent time, electronic processor 103 may deactivate (i.e., discontinue use of) the second version of the trust chain such that the third version of the trust chain becomes the current version of the trust chain and is used to issue new end entity certificates. Using this scheme, electronic processor 103 centrally manages various versions for the trust chain without any input from end entities and/or entities in the trust chain.

In addition to end entity certificates associated with devices, a PKI may also issue certificates to applications operating on a device, for example end entity 165a, wherein end entity 165a may have its own EE certificate for certain use and end entity 165a may include applications that may require additional certificates. For example, end entity 165 may include a short messaging (SMS) application, a voice over IP (VoIP) application or another application, each of which may require an additional certificate for authentication and/or encryption with an associated application server. When any of the application certificates is about to expire or has expired, the end entity 165a may send an update request (referred to herein as a first update request) for the soon-to-expire or expired application certificate. Electronic processor 103 may determine whether the trust chain associated with the application certificate in the first update request is to be updated or has been updated. If the trust chain is to be updated or has been updated, electronic processor 103 may determine whether end entity 165a includes other application certificates including the same trust chain.

In an embodiment, electronic processor 103 may request that end entity 165a send a second update request for one or more application certificates including the same trust chain, if the trust chain is to be or has been updated. Subsequent to receiving the second update request, electronic processor 103 is configured to send updated application certificates including a new version of the trust chain to end entity 165a. In another embodiment, electronic processor 103 may send an updated application certificate for the first update request including a new version of the trust chain to end entity 165a and optionally request that end entity 165a send a second update request for one or more application certificates including the same trust chain, if the trust chain is to be or has been updated. Subsequent to receiving the second update request, electronic processor 103 is configured to send updated application certificates optionally including a new version of the trust chain to the end entity 165a.

In addition to managing the trust chain certificates and versions, electronic processor 103 also manages its own certificate (i.e., the EP certificate) that is used to sign messages including trust chains sent from electronic processor 103. The same or different trust chains may be used to issue the EP certificate and the EE certificates. Similar to the certificates in the trust chain, the EP certificate also needs to be rotated when a trust chain issuing the EP certificate has been updated. Consider using the example above that during creation of the second version of the trust chain, the EP certificate needs to be updated. Electronic processor 103 is configured to automatically determine that the EP certificate needs to be updated with, for example, a second key. For example, electronic processor 103 may determine that its certificate is about to expire by monitoring the expiration date of the EP certificate. In sending the second version of the trust chain to the end entity, electronic processor 103 is configured to transmit a message signed with the private key associated with the EP certificate including the first key to the end entity 165, wherein the message includes the second version of the trust chain and may include the EP certificate including the second key. The message instructs the end entity 165 to use the second version of the trust chain. At a subsequent time, if the message includes the EP certificate, the end entity 165 may begin to use the EP certificate including the second key and the second version of the trust chain. Electronic processor 103 is also configured to subsequently discontinue use of the EP certificate including the first key such that the EP certificate including the second key becomes the current version of the EP certificate and is thereafter used by electronic processor 103.

Electronic processor 103 may also include, for example, a communications unit 102 coupled to a common data and address bus 117 of an electronic processor 103 (also referred to as the electronic processing unit 103). Electronic processor 103 may also include an input unit (e.g., keypad, pointing device, etc.) 106, an output transducer unit (e.g., speaker) 107, an input transducer unit (e.g., a microphone) (MIC) 121, and a display screen 105, each coupled to be in communication with an electronic processor unit 118.

The electronic processor 103 may include a code read-only memory (ROM) 112 for storing data for initializing system components of electronic processor unit 118. The electronic processor 103 may further include a microprocessor 113 coupled, by the common data and address bus 117, to one or more memory devices, such as a read only memory (ROM) 114, a random access memory (RAM) 104, and/or a static memory or flash memory 116. One or more of ROM 114, RAM 104 and flash memory 116 may be included as part of electronic processor 103 or may be separate from, and coupled to, the electronic processor 103.

Communications unit 102 may be used to transmit data to and receive data from devices 150, 155 and 165 in communication system 100. Communications unit 102 may include an RF interface 109 configurable to communicate with network components and other user equipment within its communication range. Communications unit 102 may include one or more broadband and/or narrowband transceivers 108, such as an Long Term Evolution (LTE) transceiver, a Third Generation (3G) (3GGP or 3GGP2) transceiver, an Association of Public Safety Communication Officials (APCO) Project 21 (P21) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 102 may also include one or more local area network or personal area network transceivers perhaps operating in accordance with an IEEE 802.11 standard (e.g., 802.11a, 802.11b, 802.11g), or a Bluetooth transceiver. The transceivers may be coupled to a combined modulator/demodulator 110. The one or more memory devices 112, 114 and 116 are configured to store non-transitory computer-executable instructions to perform a set of functions such as one or more of the steps set forth in FIGS. 2-7.

Figure 2:
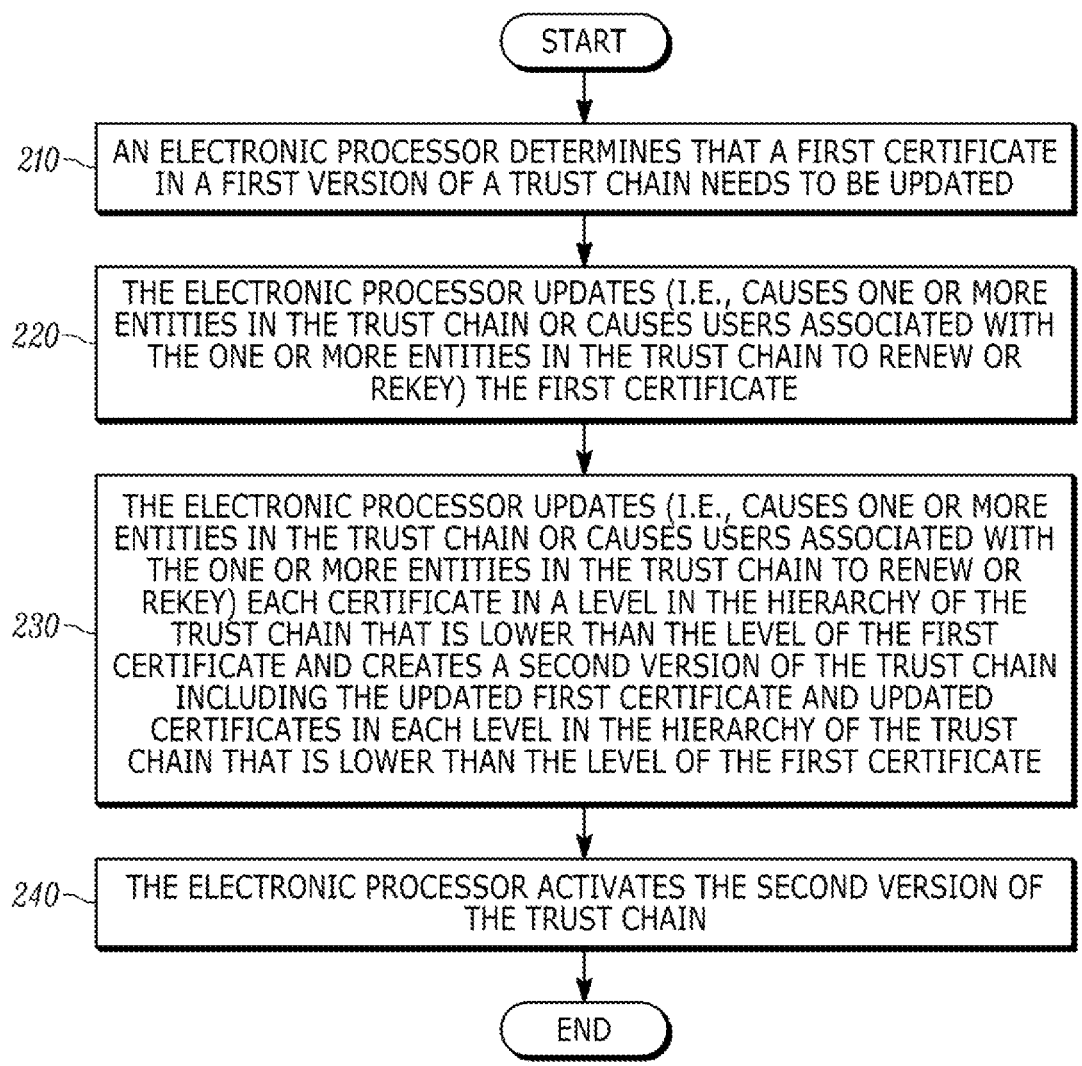
FIG. 2 is a flowchart of a method for managing versions of the trust chain in accordance with some embodiments.

FIG. 2 is a flowchart of a method for managing versions of the trust chain in accordance with some embodiments. At 210, an electronic processor, for example electronic processor 103, determines that a first certificate in a first version of a trust chain needs to be updated. For example, electronic processor may determine that the first certificate is set to expire with a predefined time period. At 220, the electronic processor updates (i.e., causes one or more entities in the trust chain or causes users associated with the one or more entities in the trust chain to renew or rekey) the first certificate. At 230, the electronic processor updates (i.e., causes one or more entities in the trust chain or causes users associated with the one or more entities in the trust chain to renew or rekey) each certificate in a level in the hierarchy of the trust chain that is lower than the level of the first certificate and creates a second version of the trust chain including the updated first certificate and updated certificates in each level in the hierarchy of the trust chain that is lower than the level of the first certificate. At 240, the electronic processor activates the second version of the trust chain such that new EE certificates are issued with the second version of the trust chain.

Figure 3:
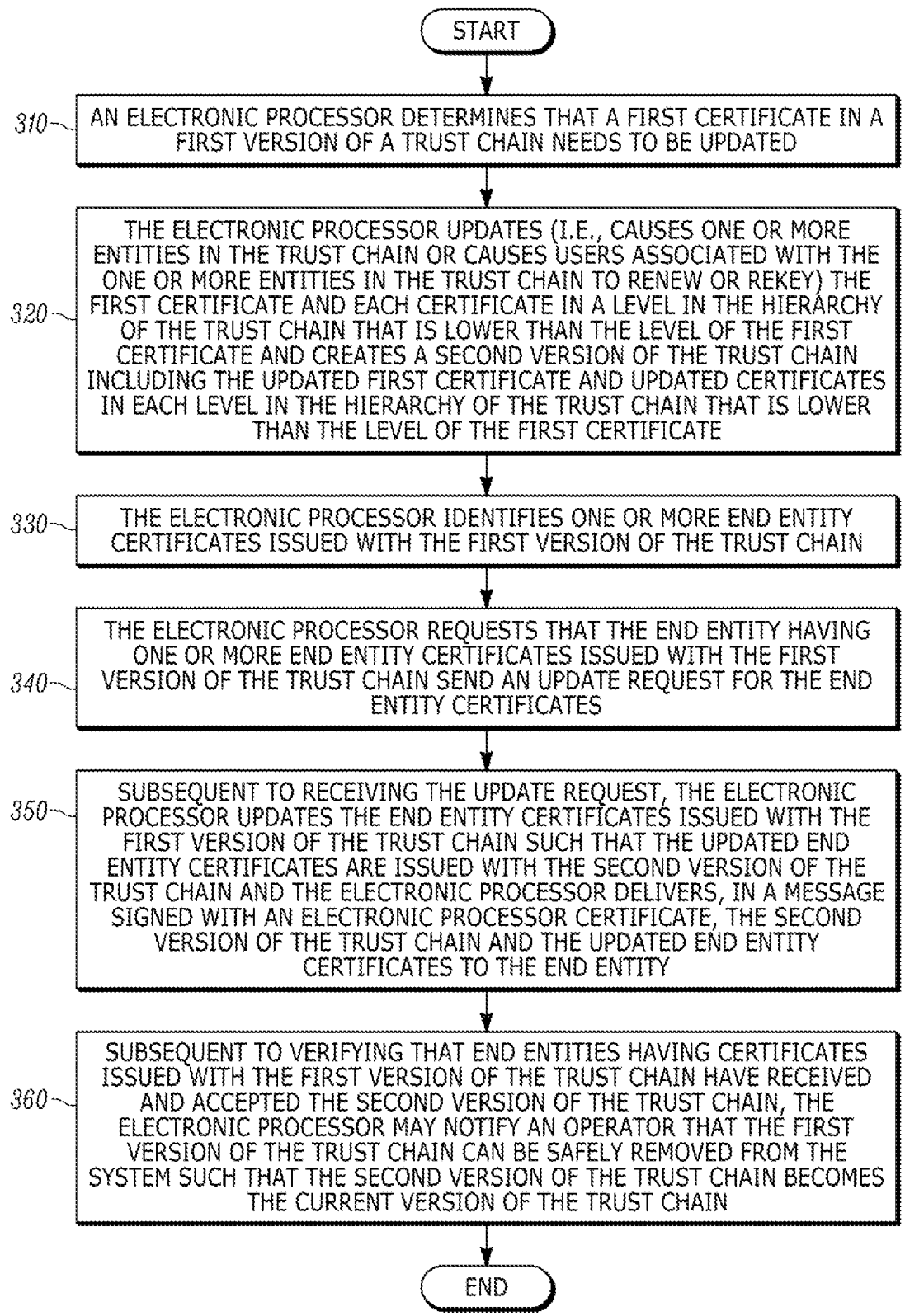
FIG. 3 is a flowchart of a method for updating an end entity certificate issued with an updated trust chain in accordance with some embodiments.

FIG. 3 is a flowchart of a method for updating an end entity certificate issued with an updated trust chain in accordance with some embodiments. At 310, an electronic processor, for example electronic processor 103, determines that a first certificate in a first version of a trust chain needs to be updated. For example, the electronic processor may monitor the first certificate and determine that the first certificate is set to expire within a predefined time period. At 320, the electronic processor updates (i.e., causes one or more entities in the trust chain or causes users associated with the one or more entities in the trust chain to renew or rekey) the first certificate and each certificate in a level in the hierarchy of the trust chain that is lower than the level of the first certificate and creates a second version of the trust chain including the updated first certificate and updated certificates in each level in the hierarchy of the trust chain that is lower than the level of the first certificate. At 330, the electronic processor identifies one or more end entity certificates issued with the first version of the trust chain. At 340, the electronic processor 103 requests that the end entity having one or more end entity certificates issued with the first version of the trust chain send an update request for the end entity certificates. At 350, subsequent to receiving the update request, the electronic processor 103 updates the end entity certificates issued with the first version of the trust chain such that the updated end entity certificates are issued with the second version of the trust chain and the electronic processor delivers, in a message signed with an electronic processor certificate, the second version of the trust chain and the updated end entity certificates to the end entity. At 360, subsequent to verifying that end entities having certificates issued with the first version of the trust chain have received and accepted the second version of the trust chain, the electronic processor 103 may notify an operator that the first version of the trust chain can be safely removed from the system such that the second version of the trust chain becomes the current version of the trust chain. The operator may be, for example, an operator of the second electronic processor 170 that is monitoring trust chains in communication system 100.

Figure 4:
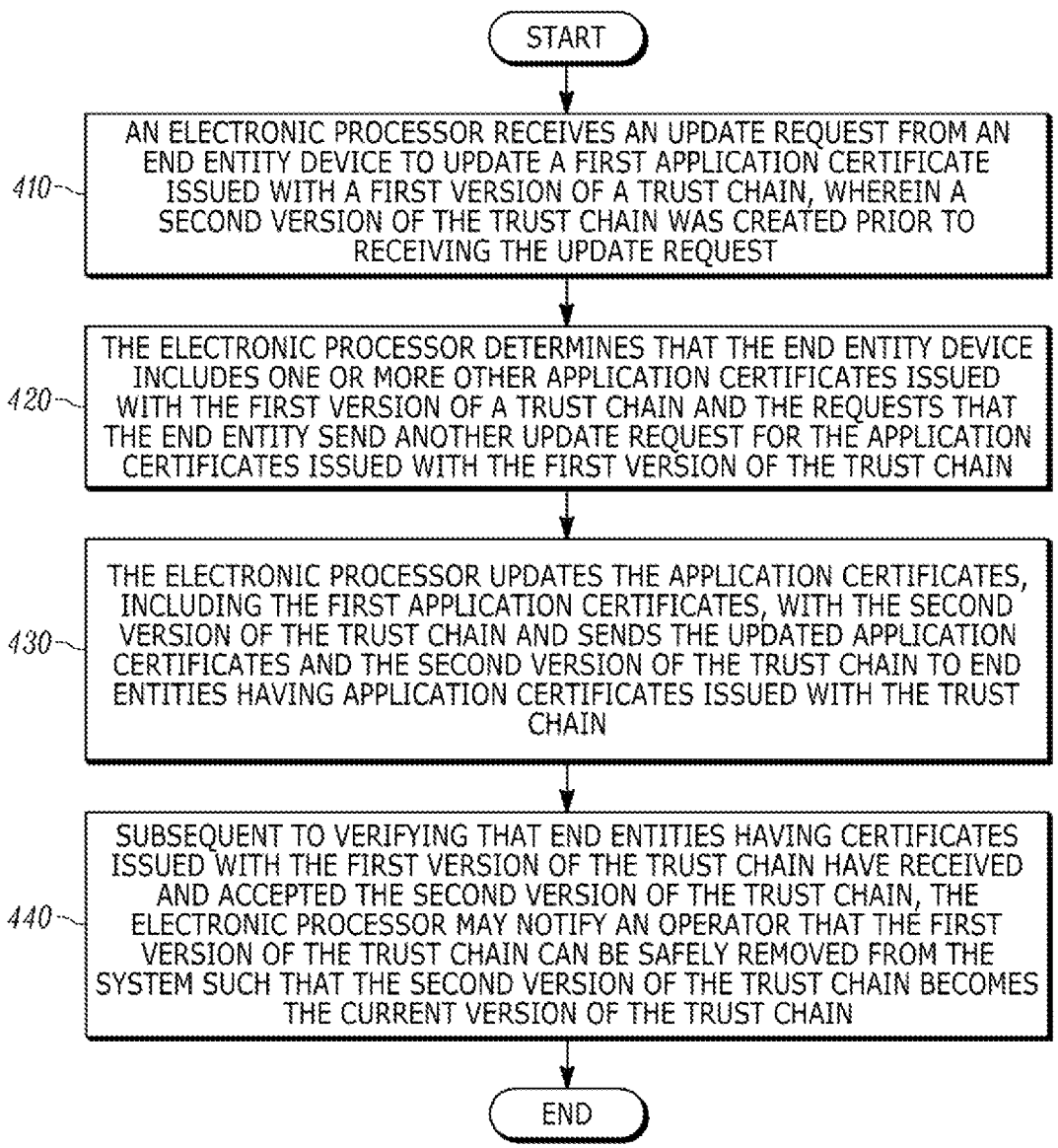
FIG. 4 is a flowchart of a method of updating certificates associated with applications in accordance with some embodiments.

FIG. 4 is a flowchart of a method of updating certificates associated with applications in accordance with some embodiments. At 410, an electronic processor, for example electronic processor 103, receives an update request from an end entity device to update a first application certificate issued with a first version of a trust chain, wherein a second version of the trust chain was created prior to receiving the update request. The first application certificate may be different from the end entity certificate and the end entity may use the first application certificate to authenticate the end entity with an application server. The update request may be triggered by an upcoming expiration of the first application certificate. At 420, the electronic processor determines that the end entity device includes one or more other application certificates issued with the first version of a trust chain and requests that the end entity send another update request for the application certificates issued with the first version of the trust chain. At 430, the electronic processor updates the application certificates, including the first application certificate, with the second version of the trust chain and sends the updated application certificates and the second version of the trust chain to end entities having application certificates issued with the trust chain. At 440, subsequent to verifying that end entities having certificates issued with the first version of the trust chain have received and accepted the second version of the trust chain, the electronic processor may notify an operator that the first version of the trust chain can be safely removed from the system such that the second version of the trust chain becomes the current version of the trust chain. The operator may be, for example, an operator of the second electronic processor 170 that is monitoring trust chains in communication system 100.

Figure 5:
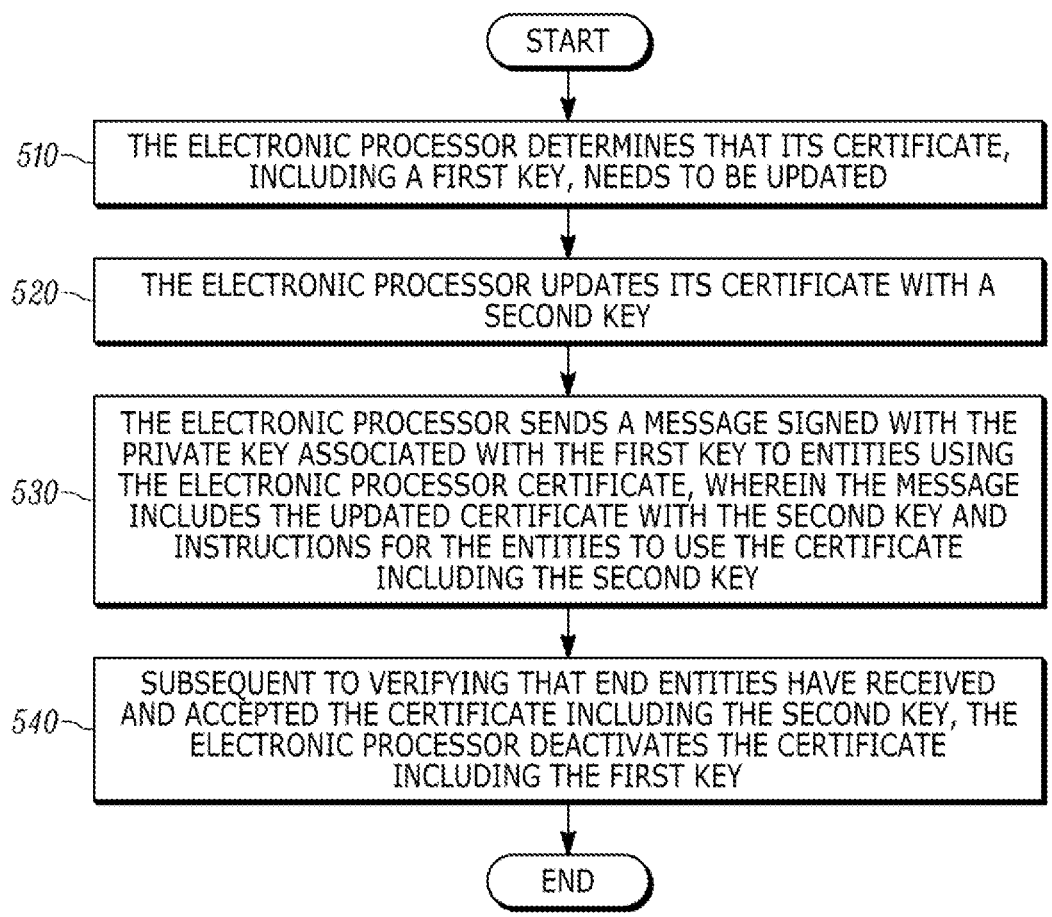
FIG. 5 is a flowchart of a method of updating a certificate associated with the electronic processor in accordance with some embodiments.

FIG. 5 is a flowchart of a method of updating a certificate associated with the electronic processor in accordance with some embodiments. At 510, an electronic processor, for example electronic processor 103, determines that its certificate, including a first key, needs to be updated. For example, the electronic processor may determine that its certificate is about to expire. At 520, the electronic processor updates its certificate with a second key. The second key is associated with the electronic processor certificate and may be owned by or assigned to the electronic processor. At 530, the electronic processor sends a message signed with the private key associated with the first key to entities using the electronic processor certificate, wherein the message includes the updated certificate with the second key and instructions for the entities to use the certificate including the second key. At 540, subsequent to verifying that end entities have received and accepted the certificate including the second key, the electronic processor deactivates the certificate including the first key.

Figure 6:
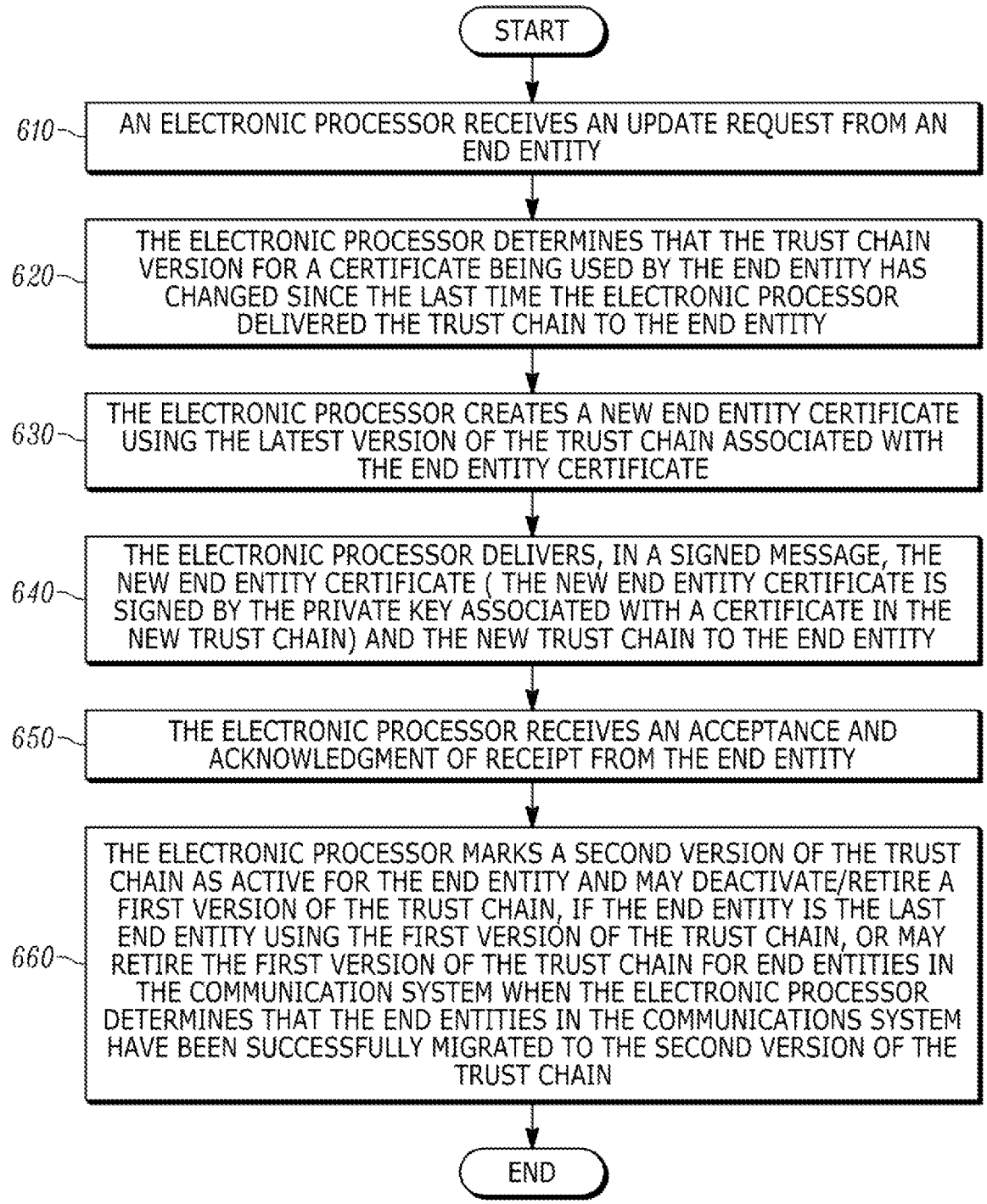
FIG. 6 is another flowchart of a method of updating certificates associated with applications in accordance with some embodiments.

FIG. 6 is another flowchart of a method of updating certificates associated with applications in accordance with some embodiments. At 610, an electronic processor, for example electronic processor 103, receives an update request from an end entity, for example end entity 165*a*. At 620, the electronic processor determines that the trust chain version for a certificate being used by the end entity has changed since the last time the electronic processor delivered the trust chain to the end entity. At 630, the electronic processor creates a new end entity certificate using the latest version of the trust chain associated with the end entity certificate. At 640, the electronic processor 103 delivers, in a signed message, the new end entity certificate (the new end entity certificate is signed by the private key associated with a certificate in the new trust chain) and the new trust chain to the end entity. At 650, the electronic processor 103 receives an acceptance and acknowledgment of receipt from the end entity. At 660, the electronic processor 103 marks a second version of the trust chain as active for the end entity and may deactivate/retire a first version of the trust chain, if the end entity is the last end entity using the first version of the trust chain, or may retire the first version of the trust chain for end entities in the communications system when the electronic processor determines that the end entities in the communications system have been successfully migrated to the second version of the trust chain.

Figure 7:
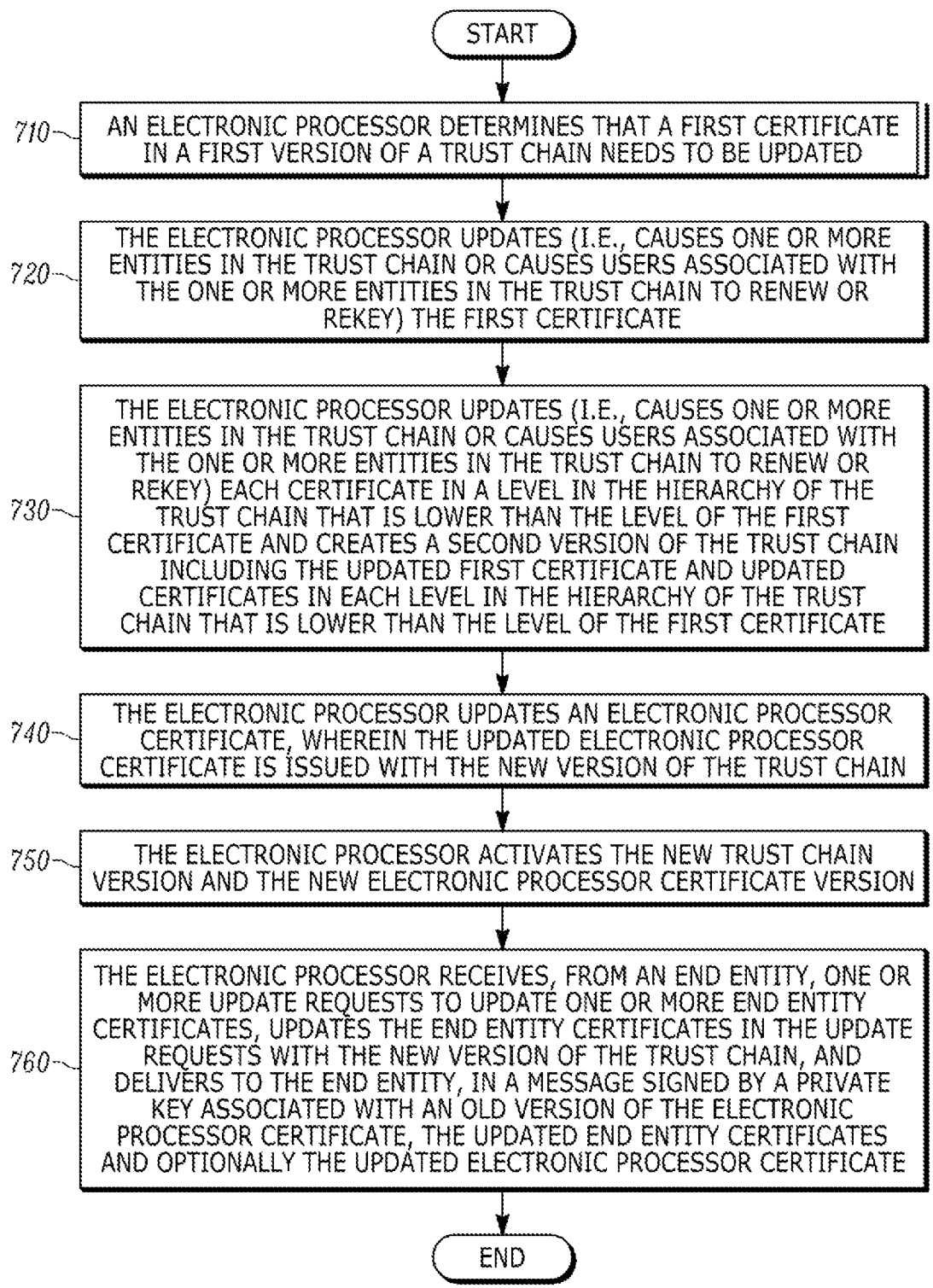
FIG. 7 is a flowchart of a method for issuing an electronic processor certificate with an updated trust chain in accordance with some embodiments.

FIG. 7 is a flowchart of a method for issuing an electronic processor certificate with an updated trust chain in accordance with some embodiments. At 710, an electronic processor, for example electronic processor 103, determines that a first certificate in a first version of a trust chain needs to be updated. At 720, the electronic processor 103 updates (i.e., causes one or more entities in the trust chain or causes users associated with the one or more entities in the trust chain to renew or rekey) the first certificate. At 730, the electronic processor 103 updates (i.e., causes one or more entities in the trust chain or causes users associated with the one or more entities in the trust chain to renew or rekey) each certificate in a level in the hierarchy of the trust chain that is lower than the level of the first certificate and creates a second version of the trust chain including the updated first certificate and updated certificates in each level in the hierarchy of the trust chain that is lower than the level of the first certificate. At 740, the electronic processor 103 updates an electronic processor certificate, wherein the updated electronic processor certificate is issued with the new version of the trust chain. At 750, the electronic processor 103 activates the new trust chain version and the new electronic processor certificate version. At 760, the electronic processor 103 receives, from an end entity, one or more update requests to update one or more end entity certificates, updates the end entity certificates in the update requests with the new version of the trust chain, and delivers to the end entity, in a message signed by a private key associated with an old version of the electronic processor certificate, the updated end entity certificates and optionally the updated electronic processor certificate.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of updating certificates in a trust chain including certificates in a hierarchical order and managing versions of the trust chain, comprising:
   determining, by a first electronic processor, that a first certificate in a first level in a hierarchy of a first version of the trust chain is to be updated;
   updating, by the first electronic processor, the first certificate and each certificate in a lower level in the hierarchy of the first version of the trust chain that is lower than the first level;
   creating, by the first electronic processor, a second version of the trust chain including the updated first certificate and the updated certificate at each lower level in the hierarchy of the trust chain;
   transmitting, by the first electronic processor, the second version of the trust chain to one or more entities; and
   deactivating the first version of the trust chain subsequent to determining that the one or more entities have migrated to the second version of the trust chain or after a predefined period after creating the second version of the trust chain.

2. The method of claim 1, wherein the determining comprises monitoring the first version of the trust chain and determining that the first certificate is set to expire at an upcoming date.

3. The method of claim 1, wherein the determining comprises receiving an update request from a second electronic processor monitoring the first version of the trust chain.

4. The method of claim 1, further comprising requesting that an end entity having an end entity certificate including the first version of the trust chain send an update request for the end entity certificate; and
   subsequent to receiving the update request, updating the end entity certificate with the second version of the trust chain.

5. The method of claim 1, wherein transmitting the second version of the trust chain comprises transmitting a message including one of the second version of the trust chain or an updated portion of the second version of the trust chain, wherein the message is signed with a private key associated with a first electronic processor certificate.

6. The method of claim 5, wherein the message includes an instruction to replace a portion of the first version of the trust chain with the updated portion of the second version of the trust chain.

7. The method of claim 5, further comprising updating the first electronic processor certificate, wherein the message is signed with the private key associated with the first electronic processor certificate and the message includes an updated certificate associated with the first electronic processor and instructions to use the updated certificate associated with the first electronic processor.

8. The method of claim 7, further comprising deactivating the first electronic processor certificate and using the updated first electronic processor certificate.

9. The method of claim 1, further comprising, after the deactivating of the first version of the trust chain, using the second version of the trust chain to issue new end entity certificates.

10. The method of claim 1, further comprising receiving an update request for a first application certificate from an end entity,
    determining that the end entity includes a second application certificate including the trust chain; and
    updating the first application certificate and the second application certificate using the second version of the trust chain.

11. An electronic processor configured to update certificates in a trust chain including certificates in a hierarchical order and manage versions of the trust chain, comprising:
    a memory storing non-transitory computer-executable instructions;
    a transceiver; and
    wherein the electronic processor is configured to perform a set of functions in response to executing the computer-executable instructions, the set of functions including:
        determining that a first certificate in a first level in a hierarchy of a first version of the trust chain is to be updated;

updating the first certificate and each certificate in a lower level in the hierarchy of the first version of the trust chain that is lower than the first level;

creating a second version of the trust chain including the updated first certificate and the updated certificate at each lower level in the hierarch of the trust chain;

transmitting the second version of the trust chain to one or more entities; and deactivating the first version of the trust chain subsequent to determining that the one or more entities have migrated to the second version of the trust chain or after a predefined period after creating the second version of the trust chain.

12. The electronic processor of claim 11, wherein the determining comprises one of monitoring the first version of the trust chain and determining that the first certificate is set to expire at an upcoming date or receiving an update request from a second electronic processor monitoring the trust chain.

13. The electronic processor of claim 11, wherein the set of functions further include requesting that an end entity having an end entity certificate including the first version of the trust chain send an update request for the end entity certificate; and subsequent to receiving the update request, updating the end entity certificate with the second version of the trust chain.

14. The electronic processor of claim 11, wherein transmitting the second version of the trust chain comprises transmitting a message including one of the second version of the trust chain or an updated portion of the second version of the trust chain, wherein the message is signed with a private key associated with a first electronic processor certificate.

15. The electronic processor of claim 14, wherein the message includes an instruction to replace a portion of the first version of the trust chain with the updated portion of the second version of the trust chain.

16. The electronic processor of claim 14, wherein the set of functions further include updating the first electronic processor certificate, wherein the message is signed with the private key associated with the first electronic processor certificate and the message includes an updated first electronic processor certificate and instructions to use the updated first electronic processor certificate.

17. The electronic processor of claim 16, wherein the set of functions further include deactivating the first electronic processor certificate and using the updated first electronic processor certificate.

18. The electronic processor of claim 11, wherein the set of functions further include, after deactivating the first version of the trust chain, using the second version of the trust chain to issue new end entity certificates.

19. The electronic processor of claim 11, wherein the set of functions further include receiving an update request for a first application certificate from an end entity, determining that the end entity includes a second application certificate including the trust chain; and updating the first application certificate and the second application certificate using the second version of the trust chain.

\* \* \* \* \*